(12) United States Patent
Vandendriessche et al.

(10) Patent No.: US 7,021,702 B1
(45) Date of Patent: Apr. 4, 2006

(54) CAB FOR AN AGRICULTURAL VEHICLE

(75) Inventors: Jean-Pierre Vandendriessche, Erpe-Mere (BE); Pieter M. I. Steen, Leper (BE); Liesbeth M. M. Longueville, Erpe-Mere (BE)

(73) Assignee: CNH America LLC, Racine, WI (US)

( * ) Notice: Subject to any disclaimer, the term of this patent is extended or adjusted under 35 U.S.C. 154(b) by 0 days.

(21) Appl. No.: 11/132,106

(22) Filed: May 18, 2005

(30) Foreign Application Priority Data

Oct. 6, 2004  (GB) ..................................... 0422122

(51) Int. Cl.
*B62D 25/06* (2006.01)

(52) U.S. Cl. ................................. 296/190.08

(58) Field of Classification Search ........... 296/190.08, 296/190.01, 210
See application file for complete search history.

(56) References Cited

U.S. PATENT DOCUMENTS

| 5,094,500 A * | 3/1992 | Maypole et al. ............ 296/102 |
| 6,322,136 B1 * | 11/2001 | Boyce et al. ................ 296/214 |
| 6,810,980 B1 * | 11/2004 | Jo et al. .................. 180/89.13 |
| 2002/0153748 A1 * | 10/2002 | Sakyo et al. ........... 296/190.08 |

FOREIGN PATENT DOCUMENTS

| GB | 2030084 | 4/1980 |
| GB | 0422122.2 | 11/2004 |
| JP | 05024493 | 2/1993 |
| JP | 09070218 | 3/1997 |
| JP | 10297281 | 11/1998 |

* cited by examiner

*Primary Examiner*—H. Gutman
(74) *Attorney, Agent, or Firm*—Rebecca Henkel

(57) ABSTRACT

A cab for an agricultural vehicle has a roof structure formed of spaced inner and outer skins, wherein the separation of the skins is greater at the front of the cab than at the rear. The reduction in the depth of the roof structure at the rear allows the door height to be raised and the vertical visibility to be improved.

5 Claims, 2 Drawing Sheets

CAB FOR AN AGRICULTURAL VEHICLE

CROSS REFERENCE TO RELATED PATENT APPLICATIONS

This patent application claims priority under 35 U.S.C. § 119 to GB 0422122.2, filed on Oct. 6, 2004 titled, "Improvements in a Cab for an Agricultural Vehicle", the full disclosure of which is hereby fully incorporated herein by reference.

FIELD OF THE INVENTION

The present invention relates to the design of a cab for an agricultural vehicle and has particular application to the cab of a forage harvester.

BACKGROUND OF THE INVENTION

As is well known, a forage harvester is a vehicle that gathers crop, chops it into forage and discharges forage through a spout into a container of a vehicle, such as a tractor or a truck, which is driven alongside the harvester. In a forage harvester, it is of great importance for the driver to be able to monitor that the forage discharged from the spout is being correctly dropped into the container that is being driven alongside.

In order to appreciate the problems overcome by the invention, it is necessary first to realize that the tip of the spout may be some five meters (approximately 16.5 feet) above ground level, and more than a meter (approximately 3.28 feet) above the driver's eye level. The improved visibility that is needed is not therefore only in azimuth but also in elevation.

One way of increasing vertical visibility would be to raise the height of the roof of the forage harvester. This, however, is not possible in practice because limits are imposed on the height of the vehicle to enable it to operate on normal roads and to avoid contact with overhead obstructions such as bridges and power cables.

Another possibility would be to make the cab narrower in order to bring the door nearer to the driver and minimize the obstruction to visibility presented by the roof. However, that would restrict the space within the cab and it would not be possible to accommodate the driver's seat, a passenger seat, and the control console.

A still further possibility would be to provide a window above the side door, but such a window would not be cleaned by the windshield wiper that is normally mounted on the door and would become useless within a very short time of operation in the field.

Accordingly, there is a need for an invention that improves visibility in order to allow the spout to be seen by the driver while sitting in his normal position, i.e. without having to bend down to peer through the top of the cab door.

SUMMARY OF THE INVENTION

According to the present invention, there is provided a cab for an agricultural vehicle having a roof structure formed of spaced inner and outer skins, wherein the separation of the skins is greater at the front of the cab than at the rear.

Preferably, the separation of the skins of the roof structure is constant in a first region lying at the front of the cab and reduces gradually and continuously in a second region extending from the first region to the rear of the cab.

Advantageously, the separation of the skins of the roof structure reduces more rapidly at the front of the second region than at the rear of the second region in order to define an upwardly curved door aperture at the rear of the cab.

The roof structure of the cab is double skinned because it accommodates ancillary equipment such as air conditioning ducts, heater controls and a radio. The space between the two skins can also be used to mount headlights. The present invention recognizes the fact that while the space between the skins needs to be large at the front of the cab, it is possible without detriment to the functioning of the ancillary equipment housed in the roof structure, to raise the inner skin at the rear of the cab without raising the outer skin. This allows the door height to be increased at the rear of the cab so as to improve visibility of the spout without increasing the external height of the cab.

While it would be possible to have a step change in the distance between the two skins, a gradual change allows the door to have an upwardly convex upper edge where it meets the roof. Such a shape is not only more aesthetically appealing but it is more functional because it allows a door mounted wiper to reach into the area through which the spout may be viewed.

BRIEF DESCRIPTION OF THE DRAWINGS

The invention will now be described further, by way of example, with reference to the accompanying drawings, in which.

DETAILED DESCRIPTION OF THE PREFERRED EMBODIMENT

Figure 1:
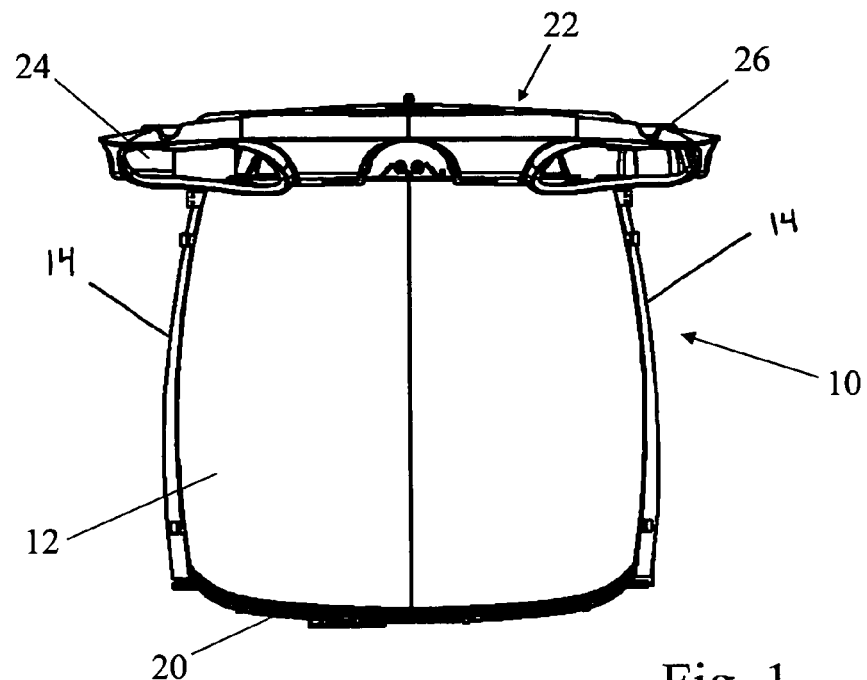
FIG. 1 is a front view of the outer shell of a cab for a forage harvester.

The terms "front and rear" are used herein in their normal sense to refer to the sides of the cab that face forwards and backwards, respectively, in the direction of travel of the vehicle.

The drawings show a cab 10 for a forage harvester. As most clearly seen from FIG. 4, the cab has single piece glass front 12, two glass side doors 14 and a rear window 16. The glass front 12, the side doors 14 and the rear window 16 are all curved in both the horizontal and the vertical plane and are supported on a tubular frame 18. The base 20 and the lower part of the back 28 of the cab 10 are preferably made of a metal, such as sheet metal, aluminium, steel, or another feasible product, and are secured to the tubular frame 18.

Figure 4:
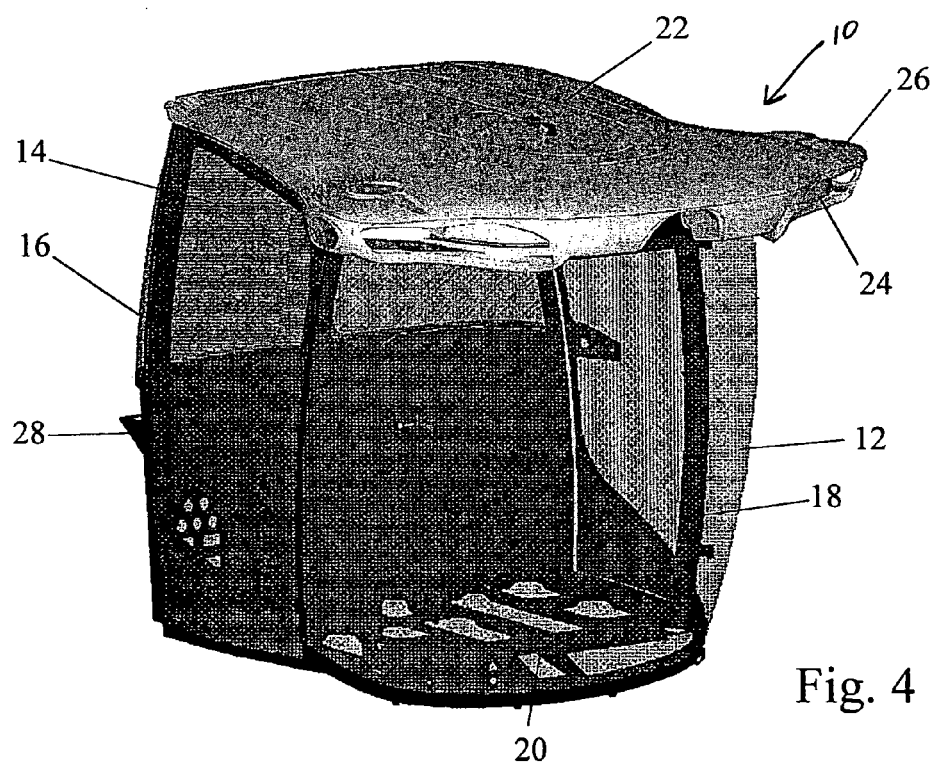
FIG. 4 is a right, front perspective view of the cab of FIG. 1.

As further illustrated in FIG. 4, the roof structure 22 of the cab 10 is formed of an outer skin 22a and an inner skin 22b. On the outside of the cab 10, the headlights 24 are situated between the two skins 22a and 22b of the roof structure 22 in two lateral projections 26 that make the roof structure 22 resemble a hammer-head shark. Within the cab 10, the roof structure 22 is used to house ancillary equipment, such as a radio, the temperature control panel, and ducts for the air conditioning system.

Figure 2:
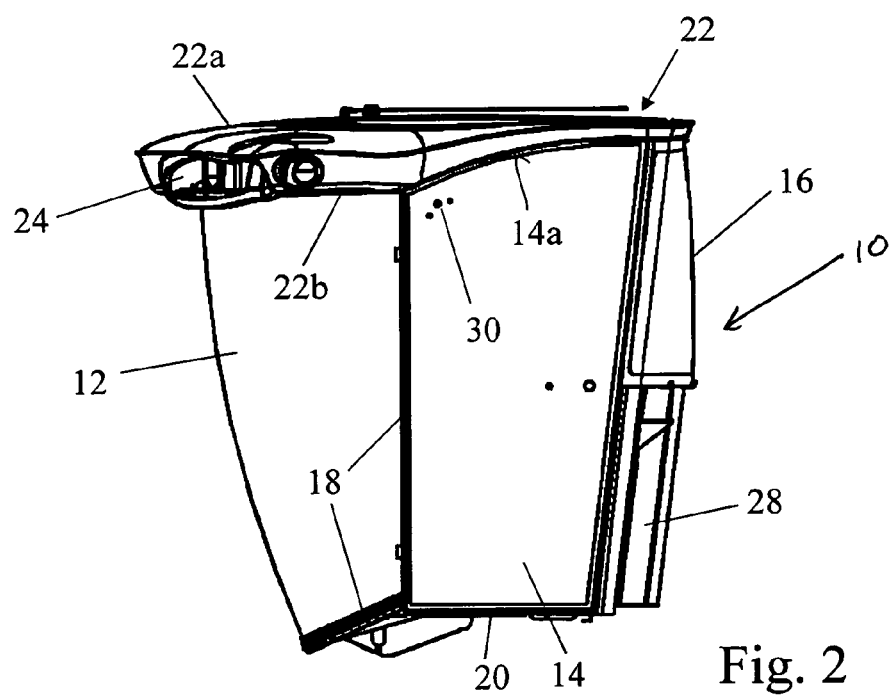
FIG. 2 is a left, side view of the cab in FIG. 1.
Figure 3:
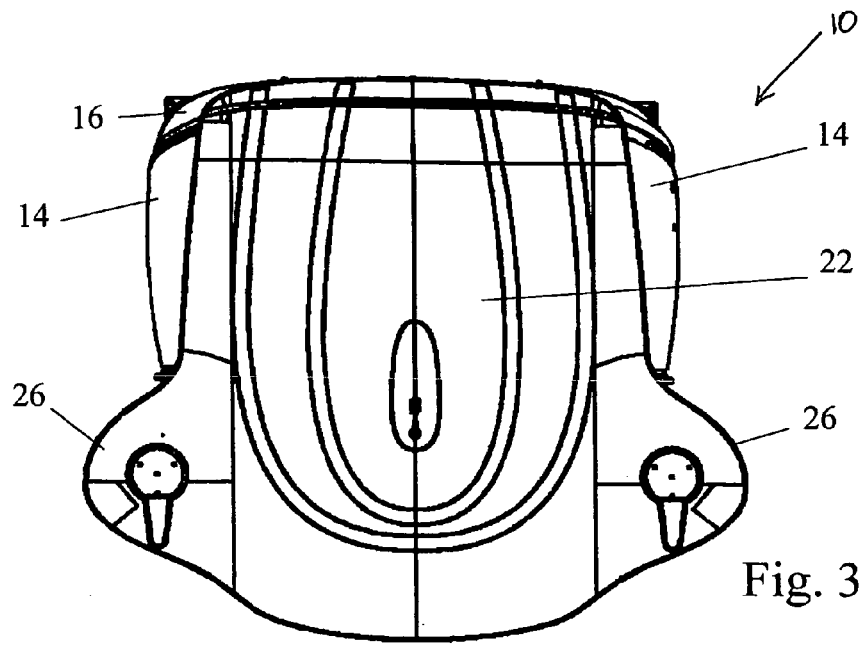
FIG. 3 is a top plan view of the cab in FIG. 1.

As best seen in FIG. 2, the two skins 22a and 22b are widely spaced at the front of the cab but the space between them reduces gradually towards the back of the cab so that the upper edge of the door 14 meets the roof structure along an upwardly convex curved edge 14a. The reduction in the depth of the roof structure 22 at the rear of the cab 10, allows the height of the glass door 14 to be increased at its rear end to improve the vertical visibility from the driver's seat.

When viewed from the front, as in FIG. 1, the cab 10 can be seen to be barrel shaped, being wider at its waist than either its top or its base. The narrow base allows room on each side of the cab for access steps (not shown) and the wide waist allows room within the cab for a driver's seat, a console panel, and a buddy seat (the interior of the cab has been omitted from the drawings in the interest of clarity). The reduced width of the cab at the top improves vertical visibility by allowing the driver to see the discharge spout (not shown) and avoid the need for him to bend down and peer through the top of the door 14.

The glass of the door 14 is kept clean by means of a wiper (not shown) mounted near the top of the hinged side of the door, as represented by the three mounting holes 30 shown in FIG. 2. The wiper is able to sweep the entire area of the door 14 up to the edge 14*a* where it meets the roof structure 22, thereby enabling the extra area of glass afforded by the present invention to improve vertical visibility and to be maintained clean at all times.

What is claimed is:

1. A cab for an agricultural vehicle, the cab comprising:
   a roof structure, the roof structure including an inner skin and an outer skin, the inner skin and the outer skin being separated from one another such that a space is defined therebetween, the separation of the inner skin and the outer skin being greater at the front of the cab than at the rear, wherein the separation is constant in a first region lying at the front of the cab, and wherein the separation reduces gradually and continuously in a second region extending from the first region to the rear of the cab.

2. A cab as claimed in claim 1, wherein the door includes an upwardly convex curved edge that meets the second region of the roof structure.

3. A cab as claimed in claim 1, wherein the second region extends across a length of the upper edge of the door.

4. A cab as claimed in claim 1, wherein a forward viewed profile of the cab is barrel shaped such that a width of a top and a base of the cab is narrower relative to a width therebetween.

5. A cab for an agricultural vehicle, the cab comprising:
   a roof structure, the roof structure including an inner skin and an outer skin, the inner skin and the outer skin being separated from one another such that a space is defined therebetween, the separation of the inner skin and the outer skin being greater at the front of the cab than at the rear, wherein the separation is constant in a first region lying at the front of the cab, and wherein the separation reduces gradually and continuously in a second region extending from the first region to the rear of the cab, wherein the separation of the inner skin and the outer skin of the roof structure reduces more rapidly at the front of the second region than at the rear of the second region, the rapid separation reduction of the second region defining an upwardly curved door aperture at the rear of the cab.

* * * * *